(No Model.)

F. H. WHEELAN.
SEPARATOR.

No. 448,394. Patented Mar. 17, 1891.

Witnesses,
Geo. H. Strong.

Inventor,
Fairfax H. Wheelan
By Dewey & Co.
Attys

UNITED STATES PATENT OFFICE.

FAIRFAX H. WHEELAN, OF SANTA BARBARA, CALIFORNIA.

SEPARATOR.

SPECIFICATION forming part of Letters Patent No. 448,394, dated March 17, 1891.

Application filed March 28, 1890. Serial No. 345,752. (No model.)

*To all whom it may concern:*

Be it known that I, FAIRFAX H. WHEELAN, a citizen of the United States, residing at Santa Barbara, Santa Barbara county, State of California, have invented an Improvement in Separators; and I hereby declare the following to be a full, clear, and exact description of the same.

My invention relates to the class of machines specially adapted for the cleaning of wheat and the cereals and leguminous seeds by separating them from the particles of dirt and other foreign material.

My invention consists in the novel constructions and method of separation hereinafter fully described, and specifically pointed out in the claims.

The principle of separation involved in my device is that of frictional contact. Separation which depends upon differences in size and upon differences in weight cannot be had in cases where no such differences exist. Thus with cereals and pulse it often happens that particles of dirt and rock have equal size and weight with the grains or seeds of the material to be saved; but such particles have not the same character of surface, and by this is meant not particularly form or shape, but smoothness and roughness. As a matter of fact, the surface of grains and seeds is much smoother than that of the particles of dirt and rock which are mixed with them. My invention is based upon this fact; and its object is to separate thoroughly the foreign particles from the grains and seeds and even to separate out imperfect and mutilated grains and seeds and branches, twigs, &c.

In the accompanying drawings I show a machine the operation of which embodies this principle and which is adapted for the purpose intended.

Figure 1:
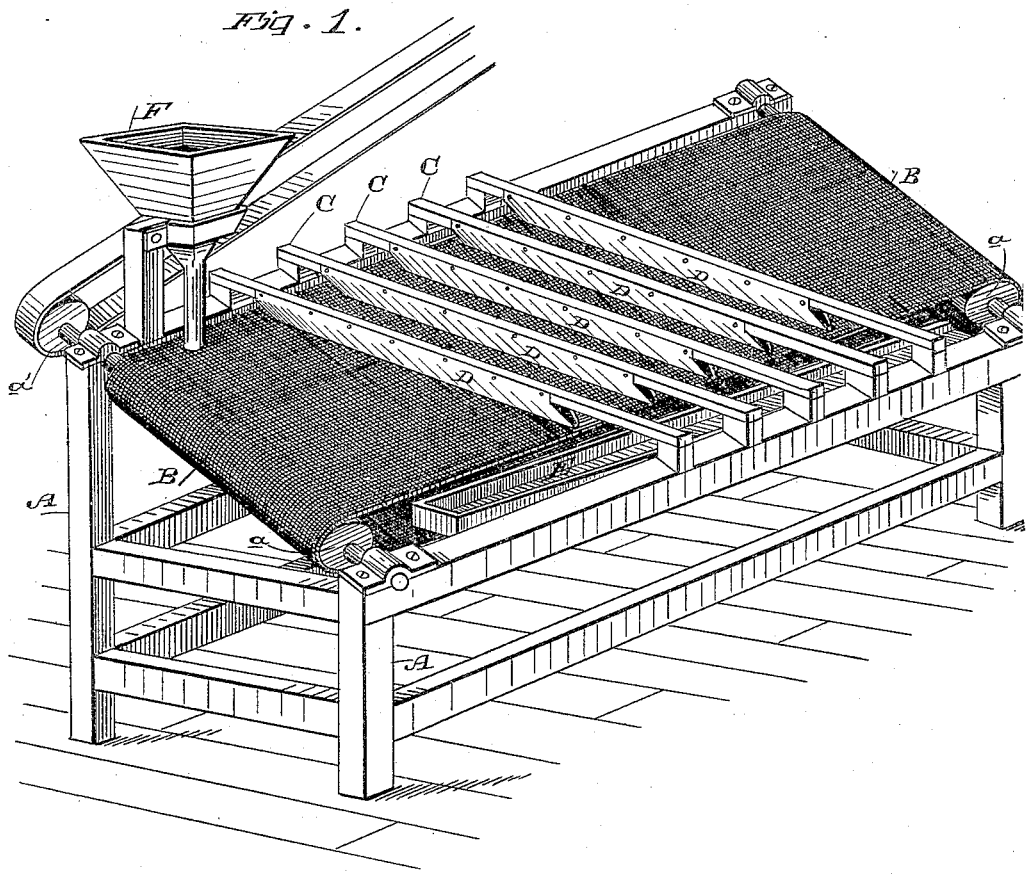
Figure 2:
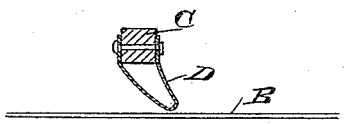

Figure 1 is a perspective view of my separator. Fig. 2 is a cross-section of one of the bars C and flaps D.

A is a frame-work which carries suitable drums *a* and a driving-drum *a'* at one end. Upon this frame is mounted a traveling table, here shown as an endless belt B, having a suitable frictional surface. Wire-cloth will serve the purpose, though I do not confine myself to its use, nor to a surface of similar rough character, for a smoother surface may be used to some advantage, for the necessary friction may be and is due in part to the surface and shape of the particles to be eradicated from the mass. Therefore a smooth-surfaced belt might be used, or one which, like rubber, has a yielding surface, though for the full effect a rough surface is preferred, though not necessarily wire-cloth, as rubber, indented, or canvas, or coarse duck, or other such fabric might be employed.

The frame A is so formed that its top stands at an angle laterally—that is to say, it inclines downwardly at right angles to the course of travel of the belt, and the latter is consequently laterally inclined. Suitable means are to be employed to effect the travel of the belt. Secured to the sides of the frame-top are the bars C, which may be of any suitable number, extending parallel to each other and so mounted that they extend over and above the surface of the traveling belt. They are inclined to the plane of the travel of the belt. Secured to these bars are the flaps D, the lower edges of which bear upon the surface of the belt. These flaps may be of any suitable material and must be of a yielding nature, due either to the material of which they are formed—as when canvas or any fabric or pasteboard or stiff paper is used—or due to a hinge joint or connection when stiffer materials are employed. Canvas answers the purpose. The flaps may be each in a continuous piece or each piece may be made in sections. These flaps D are set at a vertical angle with the surface of the belt. The angle is to be such as to effect the object of my invention—namely, the separation of the foreign particles from the grains and seeds. This angle may be varied within reasonable limits, but cannot be altered too much, for if it be too acute separation will not take place, for both the foreign particles and the grains and seeds will all pass under the flaps, and if the angle approach a right angle by the flaps being set approximately vertical or perpendicular to the surface of the belt the separation will not take place, as the foreign particles will be retarded and retained as well as the grains and seeds. The reasonable limits of this vertical angle may be generally stated to be between seventy degrees and twenty degrees. Probably the best angle would be forty-five degrees. I do not, however, confine myself to these exact limits; but I can state that, approximately, forty-five degrees will result in efficient operation.

Upon the lower side of the table is a receiving-trough E.

F is a feed-chute, which is arranged to deliver the material upon the head of the belt at its upper side.

The operation is as follows: The material being fed to the belt is carried forward until it meets the first flap. Then the smooth-surfaced grains and seeds tend to roll along the belt-surface toward its lower side and along the inclined flap, both inclinations serving to this end. They have no tendency to pass under the flap, or such of them as do pass under meet with resistance at the next flap, and so on, each flap tending to roll them down the incline until they are discharged over the lower side of the belt into the trough. The rougher-surfaced and misshapened foreign particles, on the contrary, cling to the belt-surface, and upon reaching the flaps force themselves under and are by them pressed down upon the belt and do not roll down to the lower side, or if they tend so to do their angle in this direction is so small that they reach the end of the belt and are discharged before they reach the side. The flaps do not retard them or guide them down, but tend to press them the closer, and they pass under them readily. The same is true of the mutilated grains and seeds and small twigs and sticks, so that only the perfect grains and seeds are retarded or retained by the flaps and given a direction which carries them down to the side of the belt.

It will be seen from the foregoing that the method of separation herein lies in creating in any material composed of particles of different degrees of smoothness different coefficients of friction between said particles and the surface upon which they lie by means of a pressure to which the material is subjected and in applying a moving power whereby these different frictional coefficients are taken advantage of to effect through the movement a separation of those having certain coefficients of friction from those having other coefficients of friction.

Having thus described my invention, what I claim as new, and desire to secure by Letters Patent, is—

1. In a separator for grains and seeds, a table upon which the material is fed and yielding flaps over said table, said table and flaps being the one movable with relation to the other, and the flaps arranged at such a vertical angle to the surface of the table as to effect a separation of the foreign particles by pressing them into such frictional contact with the table that they will pass the flaps, while the grains and seeds will not pass them, substantially as herein described.

2. In a separator for grains and seeds, a moving table upon which the material is fed and yielding flaps arranged above the table at such a vertical angle to the surface thereof as to effect a separation of the foreign particles by pressing them into frictional contact with the table, whereby they pass said flaps, while the grains and seeds do not, said flaps being longitudinally laterally inclined to the plane of travel of the table, whereby the grains and seeds are rolled along by them and discharged from the side of the table, substantially as herein described.

3. In a separator for grains and seeds, a traveling table upon which the material is fed, said table being inclined at right angles to its direction of travel, and yielding flaps above the table and inclined to its surface at such a vertical angle as to effect a separation of the foreign particles from the grains and seeds as the material is brought into contact with them, said flaps being longitudinally laterally inclined to the plane of travel of the table, whereby the grains and seeds are guided down the inclines of the flaps and table to the lower side thereof, while the foreign particles pass on by the flaps with the table, substantially as herein described.

4. A separator for grains and seeds, consisting of the laterally-inclined frame, the endless traveling laterally-inclined belt carried thereby, the fixed inclined bars extending over the surface of the belt at a lateral inclination, and the yielding flaps secured to said bars and arranged at such a vertical angle to the surface of the belt as to effect a separation of the foreign particles by pressing them into said frictional contact with the belt that they will pass the flaps, while the grains and seeds will not pass them, substantially as herein described.

5. A method of separating material composed of particles of different degrees of smoothness, which consists in feeding the material upon a surface, subjecting it to such a pressure thereon as to develop in the different particles different coefficients of friction between them and the surface, and moving said material on or with said surface, thereby separating these particles having the greater from those having the lesser frictional coefficient, substantially as herein described.

In witness whereof I have hereunto set my hand.

FAIRFAX H. WHEELAN.

Witnesses:
S. H. NOURSE,
H. C. LEE.